Dec. 8, 1931.  W. J. ROULEAU  1,835,903
COMPUTING SCALE
Filed Jan. 12, 1928  3 Sheets-Sheet 1
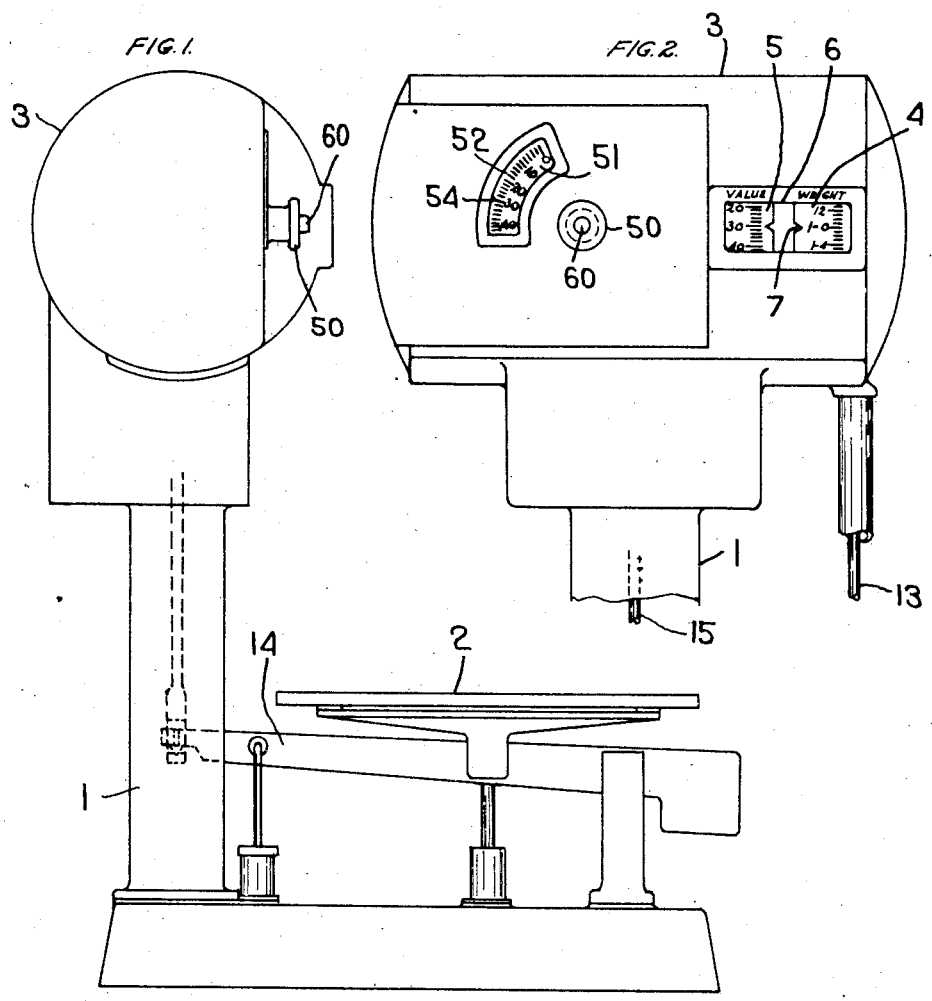

Dec. 8, 1931.  W. J. ROULEAU  1,835,903
COMPUTING SCALE
Filed Jan. 12, 1928   3 Sheets-Sheet 2

Inventor
Wilfred J. Rouleau
by Heard Smith & Tennant
Attorneys.

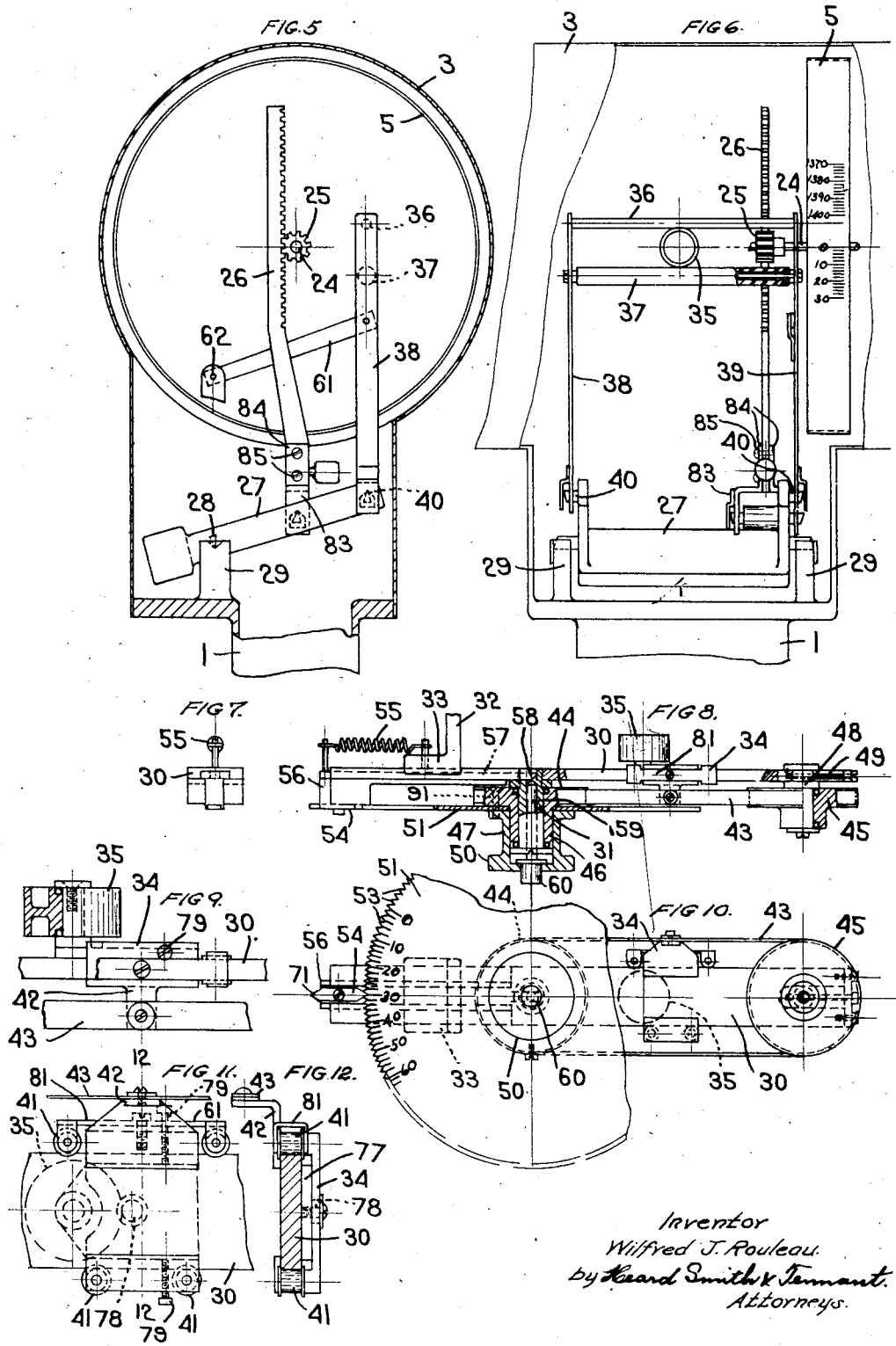

Patented Dec. 8, 1931

1,835,903

UNITED STATES PATENT OFFICE

WILFRED J. ROULEAU, OF QUINCY, MASSACHUSETTS, ASSIGNOR TO DAYTON SCALE COMPANY, OF DAYTON, OHIO, A CORPORATION OF NEW JERSEY

COMPUTING SCALE

Application filed January 12, 1928. Serial No. 246,301.

This invention relates to computing scales of that type in which two separate dials are employed, one for indicating the weight and the other for indicating the price.

The invention is in the nature of an improvement on the device illustrated in my Patent No. 1,623,134, April 5th, 1927 and has for its general object to provide an improved price-indicating means and an improved method of adjusting the latter for different prices per pound.

In order to give an understanding of the invention I have illustrated in the drawings a selected embodiment thereof which will now be described after which the novel features will be pointed out in the appended claims.

Fig. 1 is a side view of a scale embodying my invention;

Fig. 2 is a front view of the indicating portion of the scale;

Fig. 5 is a transverse vertical sectional view showing the means for operating the price-indicating dial;

Fig. 6 is a front view of a portion of the scale with parts broken out and illustrating the price-indicating dial and its actuating mechanism in front view;

Fig. 7 is an end view of the slide shown in Fig. 8;

Fig. 8 is a fragmentary sectional view illustrating the means for adjusting the price-indicating mechanism for different prices;

Fig. 9 is a fragmentary view in plan of the adjustable carriage of the price-indicating adjustment;

Fig. 10 is a front view of a portion of the price-indicating mechanism;

Fig. 11 is a front view of Fig. 9;

Fig. 12 is a section on the line 12—12, Fig. 11.

Figure 3:
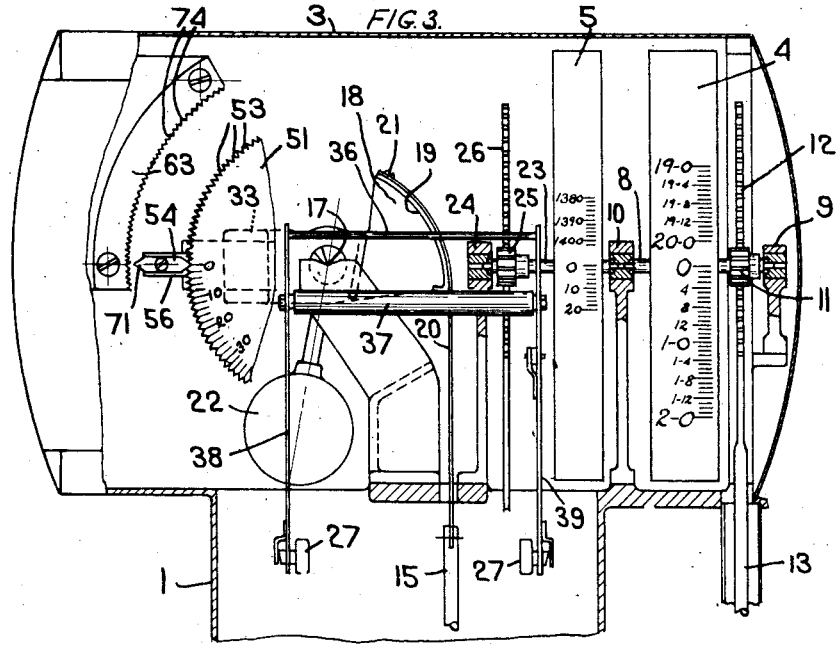
Fig. 3 is a front view of the scale with the casing and parts broken out to better illustrate the construction.

Inasmuch as the present invention relates entirely to the price-indicating mechanism of the scale I have not thought it necessary to illustrate the details of the complete scale herein.

In Fig. 1, which is a side view of a scale, 1 is the main frame on which is supported the usual platform 2 on which the articles to be weighed are placed. The frame 1 supports at its upper end a cylindrical casing or housing 3 in which is received both the weight-indicating dial 4 and the price-indicating dial 5. The casing 3 is shown as having a sight opening 6 through which the dials may be read.

The weight-indicating dial 4 is connected to the platform 2 by any suitable or usual means in the form of levers or connections so that whenever an article is placed on the platform 2 the dial 4 will be turned to indicate the weight of the article. The sight opening 6 has a stationary indicator 7 which co-operates with the dial 4 to give the proper reading. In the present embodiment of the invention the weight-indicating dial is in the form of a short cylinder or drum which is carried by a shaft 8 journalled in suitable bearings 9, 10. Said shaft has a pinion 11 thereon which meshes with a rack 12 carried by a connection 13 that leads to a system of levers 14 on which the platform is mounted. This system of levers is also connected by another connection 15 to a counterbalance member which is herein shown as a rocking frame 16 supported on the knife edges 17.

The connection between the member 15 and the counterpoise member 16 is through the medium of a flexible strap 20 which is connected at one end to the member 16 and at the other end to the upper end of a curved surface 19 formed on an arm 18 which is rigid with the frame 16, the flexible strap 20 overlying the curved surface as shown best in Fig. 3.

The counterpoise member 16 may derive its counterbalance or counterpoise effect either by means of a weight or by a spring. In the construction herein shown a weight is used, this being indicated at 22 and being in the form of a pendulum weight rigid with the frame 16.

This weighted arm 22 is arranged so that when there is nothing on the platform and the scale shows "0" weight the arm will hang nearly vertical. When weight is applied to the platform and the connections 13 and 15 are moved downwardly the weight 22 will be swung upwardly and as it moves upwardly its leverage is increased. The weighted arm 22 will, therefore, assume different positions according to the weight on the platform 2 and the reading on the dial 4 will at all times give the correct weight.

The price-indicating dial 5 is carried by a suitable shaft 23 which is journalled in bearings 10 and 24. Said shaft has thereon a pinion 25 meshing with a rack 26 which is connected to a swinging counterbalanced frame 27, the latter being pivotally supported by knife edge bearings 28 on supports 29. The swinging frame 27 is connected to the counterpoise member 16 by an adjustable means which includes a price-per-pound adjustment so that when the price-per-pound adjustment is set to indicate any desired price per pound the dial 5 will be rotated into a position to indicate the total price of the article being weighed.

The dial 5 may be graduated in terms of any standard currency and as herein shown it is graduated in U. S. currency, the figures illustrated on the dial indicating cents.

The rocking counterpoise member 16 has rigid therewith an arm 30, said arm being rigidly secured to the foot portion 33 of a bracket arm 32 which is rigid with the member 16. Since the arm 30 is rigid with the counterpoise member 16 said arm and member will turn as a unit about the knife edge 17 as the axis.

Mounted on the arm 30 is a carriage 34, said carriage carrying a roll 35 which is situated between two parallel members 36, 37 that are supported in two straps or connections 38, 39 that in turn are pivoted at their lower ends to the swinging frame 27 as shown at 40. The pivotal connections 40 are preferably knife edge bearings. With this construction it will be seen that whenever the arm 30 is swung about its axis (which is the axial line of the knife edges 17) by downward movement of the platform, the swinging movement of the arm will be communicated through the roll 35 and cross bars 36, 37 and connections 38, 39 to the swinging frame 27 and the movement of the latter will be communicated through the rack 26 and pinion 25 to the price-indicating dial 5.

Figure 4:
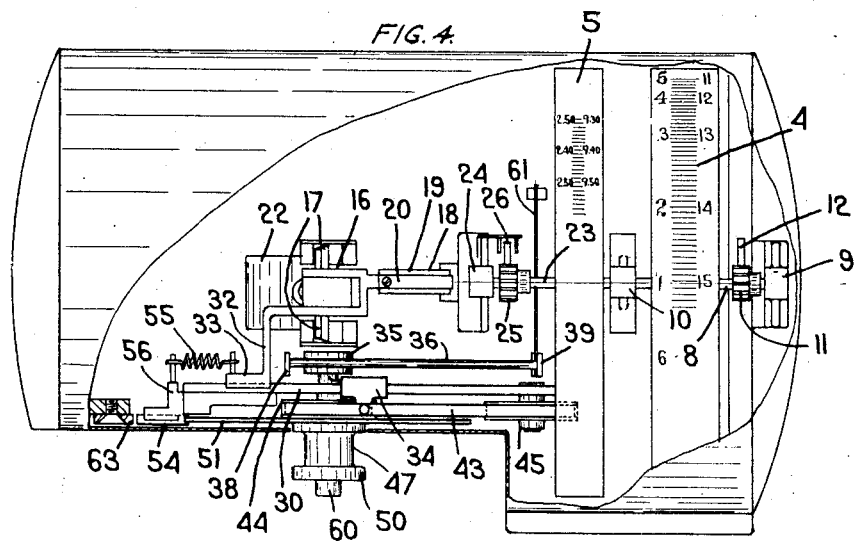
Fig. 4 is a top plan view with the casing broken out.

The curved surface 19 is so designed and shaped that for every equal increment of weight added to the platform 2 the roll 35 will be moved an equal distance downwardly regardless of the position of the carriage 34. The curve 19 is not necessarily a true arc nor is it struck from the knife edge 17 as a center but it is designed so as to produce the above-stated results. Whenever any weight is placed on the platform 2 the arm 30 will, therefore, be swung into a predetermined position, the position of the arm varying with the weight. The amount of movement, however, which the arm 30 gives to the swinging frame 27 and the dial 5 depends upon the position of the roll 35 relative to the axis of movement of said arm. If, for instance, the roll 35 is in axial alignment with the arm 30 as shown in Fig. 4 then the roll 35 will have no up and down movement as the arm 30 swings and consequently the price-indicating disk 5 will remain stationary. If, however, the carriage 34 is adjusted so as to place the roll 35 out of axial alignment with the axis of the arm 30 as shown in Fig. 8 then as the arm 30 is swung about its pivot by weight being placed on the platform 2 the roll 35 will have a downward movement which will operate as above described to turn the dial 5.

I have provided herein simple means for adjusting the roll 35 for different prices per pound. The carriage 34 is constructed to embrace the arm 30 as shown in Fig. 12 and is provided with anti-friction rolls 41 engaging the top and bottom edges of the arm 30. The rolls 41 engaging the top edge of the arm 30 are mounted in resilient supports 81 which are secured to the carriage and which yieldingly hold rolls against the arm. This carriage is provided with a bracket 42 which is secured to an endless flexible band 43, said band extending around two pulleys 44, 45. The pulley 44 is rotatively mounted on the arm 30 co-axially with the knife edges 17 and, therefore, co-axial with said arm. This pulley 44 has a hub 46 which is journalled on a bearing stud 31 that is rigid with the arm 30 and which is located co-axially with the knife edges 17.

Mounted on the hub 46 is a disk 51 graduated to indicate different prices per pound, said disk being preferably situated just inside the housing 3 and the latter being provided with a sight opening 52 through which the portions of the graduations on the disk can be read. The disk 51 is clamped to the pulley 44 through the medium of a clamping sleeve 47 which is received over the hub 46, said pulley, disk and sleeve being clamped together by suitable screws 91. The sleeve 47 is provided at its outer end with a thumb piece or knurled head 50 by which it and the disk 51 may be turned. It will thus be noted that the disk 51 and the arm 30 with its carriage 34 are all mounted on and rigid with the counterpoise member 16.

The pulley 45 is shown as supported in a bearing member 48 which is adjustably mounted in the end of the arm 30, said bearing member being adjusted and held in adjusted position by means of an adjusting screw 49. The object of the adjustable bearing for the pulley 45 is to provide means for maintaining the endless band 43 properly tensioned.

Means are provided for locking the disk 51 in any adjusted position relative to the arm 30. One way of accomplishing this is to provide the periphery of the disk with serrations or teeth 53 which co-operate with a locking pawl 54 carried by a slide 56 that is slidably mounted in the end of the arm 30, said slide being acted on by a spring 55, one end of which is connected to the foot 33, and which yieldingly holds the pawl 54 into engagement with the teeth 53.

Means are provided for releasing the pawl whenever it is desired to adjust the disk 51, and in the present embodiment of my invention I have arranged a pawl-releasing means which is associated with the knob 50.

The slide 56 is provided with a stem 57 which extends along a groove formed in the back face of the lever 30, the end 58 of the stem being bevelled and terminating in substantially the axial line of the lever 30. 59 indicates a push pin which is slidably mounted in the journal 31 and the pointed end of which engages the bevel face 58. The end 60 of the pin 59 extends through the sleeve 47 so that by pressing on the end 60 of the pin the stem 57 will be cammed to the left Fig. 8 thus withdrawing the pawl 54 from engagement with the disk 51.

The spring 55 serves to return the pawl to its operative position into locking engagement with the disk 51 when the push pin 60 has been released.

The means for locking the disk 51 to the arm 30 is preferably constructed so that it also may be used to lock the arm 30 from turning movement when the disk 51 is released and while it is being adjusted. This is an advantage because the adjustment of the disk 51 can be more easily and accurately attended to if the arm 30 is held rigid during the adjustment of the disk and by using a locking device which in one position will lock the disk 51 to the arm and in another position will release the disk to lock the arm the operation of adjusting the disk 50 is facilitated.

In the construction herein shown the pawl 54 is a double-ended pawl, the outer end 71 of which co-operates with a curved locking member 63 which is stationarily carried by the casing 3 and is formed on its concave face with locking teeth 74. The construction is such that when the plunger 50 is depressed to disengage the pawl 54 from the teeth 53 it will bring the end 71 of the pawl into locking engagement with the teeth 74 thus locking the arm 30 from rotative movement. The disk 51 may then be adjusted to a position corresponding to the price per pound of the article to be weighed. In adjusting the disk the pawl 54 acts as an indicator mark to indicate when the disk is properly adjusted.

The operation of the device will be readily understood from the foregoing but may be briefly summarized as follows. Assuming for instance that an article is being sold for which the price is thirty cents (30¢) a pound, the operator will grasp the knob 50 and depress the plunger 60 thereby releasing the price-per-unit disk 51 after which he will rotate the knob 50 so as to set said disk at the numeral "30", this being done by bringing the graduation mark "30" opposite the locking pawl 54 as shown in Fig. 10. During this operation the end 71 of the locking pawl 54 is in locking engagement with the sector 63 and thus the arm 30 is prevented from having any turning movement. When the price-per-unit disk 30 has been properly adjusted the plunger 60 is released and the locking pawl 54 will automatically engage with the tooth 53 of said disk 51 thereby locking it in position.

This turning of the disk 51 rotates the pulley 44 since the latter is rigid with the disk and thereby gives movement to the endless band 43 and to the slide 34. The movement of the slide 34 carries the roll 35 between the cross bars 36, 37 into an adjusted position corresponding to thirty cents (30¢) per pound. This adjustment of the disk 51 may be accomplished either before the article to be weighed is placed on the weighing platform 2 or after the article is so placed. If the adjustment is made before placing the article on the platform 2 then such adjustment will be accomplished while the arm 30 is horizontal and parallel to the cross bars 36, 37, this being the position of said bars when there is no weight on the scale platform. In such case the only indication that an adjustment has been made will be that the position of the disk 51 will appear to have been changed as seen through the sight opening 52.

When the disk 51 has been properly adjusted, (and by the construction herein shown this can be accomplished quickly and easily) then the article to be weighed is placed on the scale. If such article weighs just one pound then the weight-indicating dial 4 will be turned to bring the "1" indication opposite the pointer 7 as indicated in Fig. 2. Simultaneously with this movement of the dial 4 the value- or price-indicating dial 5 will be turned to bring the graduation "30" opposite the pointer 7 as seen in Fig. 2.

If instead the price per pound were fifty cents (50¢) then the operator would adjust the price-per-unit disk 51 to bring the graduation "50" opposite the pointer 54 and such adjustment of the disk would operate through the endless band 43 to shift the roll 35 nearer the end of the arm 30 or further from the axis thereof. Consequently for a given swinging movement of the arm 30 corresponding to the weight of one pound would give a greater movement to the swinging frame 27 and through the rack 26 and pinion 25 to the price-indicating dial 5, such added movement being sufficient to bring the graduation "50" on said dial opposite the pointer 7.

I have stated above that the adjustment of the price-per-unit disk 51 might be accomplished either before or after the article to be weighed is placed on the weighing platform 2 and have described the adjusting of said disk before the weight is applied to the scale. If the adjustment is effected after the weight is applied to the scale and consequently while the arm 30 is in an inclined position then during any adjustment of the disk 51 the roll 35 will simply be moved longitudinally of the inclined arm 30 and during such movement the price-per-unit dial 5 will be turned to bring the correct price for said article into line with the indicator 7. During this adjustment, however, the weight-indicating dial 4 will remain stationary, the moving of the slide 34 on the arm 30 merely operating to effect the proper adjustment of the price-indicating dial.

In order that the scale may give accurate indication it is important that when it is set at "0" the roll 35 should be exactly in axial alignment with the knife edge 17. In order to maintain such alignment I have provided means whereby the roll may be adjusted vertically slightly with reference to the arm 30. The roll 35 is journalled on a plate 77 which is pivoted to the carriage 34 at 78. The carriage carries two adjusting screws 79 which engage opposite sides of the plate 77. The pivotal point 78 of the plate with the carriage 34 is situated between the roll and the screws 79 so that when either screw is backed off and the other screw tightened up the plate 77 will be turned slightly thus swinging the roll 35 up or down. By this means the roll can be kept in proper alignment with the knife edge 17.

Each of the dials shown in Figs. 3 and 4 contains one set of figures only which are arranged to be read from the front side of the scale, this being the side where the sales clerk is positioned. If it is desirable to enable the customer, who usually stands on the opposite side of the scale from the salesman, to read the dials I propose to make each dial with two sets of figures, one set being arranged as shown in Figs. 1 and 2 to be read by the salesman and the other set being arranged reversely so that they can be read by the customer through a sight opening on the back of the casing 3. Such an arrangement of figures is shown in Fig. 4.

I also propose to make the connection between the rack arm 26 and the swinging frame 27 an adjustable connection so that the rack may be adjusted slightly if necessary in order to bring the zero graduation on the dial 5 at the correct position when the weighing platform is empty. The rack 26 is connected at its lower end to a yoke 83 which has the knife edge bearing connection with the swinging frame 27. The yoke 83 is provided with up-standing arms 84 which overlie the lower end of the rack 26 and are connected thereto by screws 85, and extend through both arms 84 and the lower end of the rack. By having the openings in the rack arm 26 slightly larger than the screws it is possible to effect an adjustment of the rack relative to the frame 27 by simply loosening the screws. After the proper adjustment has been made the screws may be tightened to retain such adjustment.

While I have illustrated herein a selected embodiment of my invention I do not wish to be limited to the constructional features shown.

I claim:

1. In a computing scale, the combination with a weighing platform, of a counterpoise therefor, a pivoted arm connected with the counterpoise, a carriage on said arm, an endless band on the arm for adjusting the carriage thereon into positions corresponding to different prices per unit, a price-indicating dial, and connections between said arm and dial including said adjustable carriage for operating the dial.

2. In a computing scale, the combination with a weighing platform, of a counterpoise therefor, a weight-indicating dial and connections therefrom to the platform for indicating the weight on the platform, a pivoted arm connected to and moved by the counterpoise, a carriage movable longitudinally of the arm, an endless band on the arm attached to the carriage for adjusting it into positions corresponding to different prices per unit, a price-indicating dial, and connections between said arm and price-indicating dial including said carriage for operating the latter dial.

3. In a computing scale, the combination with a weighing platform, of a counterpoise therefor, a pivoted arm connected to and moved by the counterpoise, two pulleys mounted on said arm, one of which is coaxial therewith, an endless band surrounding the pulleys, a carriage slidable on said arm and attached to said band to be adjusted thereby, a price-indicating dial and connections between said arm and dial including said carriage for operating the dial.

4. In a computing scale, the combination with a weighing platform, of a pendulum counterbalancing mechanism therefor, a weight-indicating dial and connections therefrom to the platform for indicating the weight on the platform, a pivoted arm attached to and moved by the counterpoise, two pulleys on said arm, one of which is co-axial therewith, an endless band surrounding the pulleys, a carriage slidable longitudinally of the arm and connected to the band to be adjusted thereby, a price-indicating dial and connections between said arm and price-indicating dial including said carriage for operating the latter dial.

5. In a computing scale, the combination with a weighing platform, of a counterpoise therefor, an arm rigid with the counterpoise, a carriage on the arm, an endless band on the arm for adjusting the carriage thereon into positions corresponding to different prices per unit, a roll on the carriage, a price-indicating dial, a vertically-moving member having two horizontal cross bars between which the roll operates, and connections between said member and the dial by which the latter is turned to a position which is determined by the amount of weight on the platform and the position of the carriage on the arm.

6. A computing scale as in claim 5 having means for adjusting the roll vertically with reference to the arm.

7. A computing scale as described in claim 2, in which both the weight-indicating dial and the price-indicating dial are provided with two sets of graduations, one readable from one side of the scale and the other from the other side thereof.

8. In a computing scale, the combination with a weighing platform, of a pivoted counterpoise therefor provided with an arm having a curved surface, a connection between said platform and counterpoise including a flexible strap secured to said arm and overlying the curved surface, an arm connected with the counterpoise member, a carriage slidably mounted on said arm, a roll on the carriage, a price-indicating dial, a movable frame engaging said roll and connected to the dial, and means to adjust the carriage on the arm into positions corresponding to different prices per unit, said curved surface of the counterpoise member having such a curvature that for equal increments of weight added to the platform the roll will be moved downward equal distances.

9. In a computing scale, the combination with a weighing platform, of a pivoted counterpoise therefor, an arm rigid with the counterpoise, a carriage on said arm provided with a roll, a swinging frame actuated by said roll as the counterpoise is turned, a rack adjustably connected to said swinging frame, a price-indicating dial actuated by said rack, and means for adjusting the carriage on said arm into positions corresponding to different prices per unit of weight.

10. A computing scale comprising a load counterbalancing mechanism, weight indicating means operatively associated therewith, a pivoted arm connected with said mechanism, price indicating means, connections between said arm and price-indicating means for operating the latter, said connections including an element movable on the arm for adjusting the price indicating means relative to the weight indicating means, means for adjusting said element on the arm, and a price per unit of weight indicating means rotated by said latter adjusting means.

11. A computing scale comprising load counterbalancing means, a pivoted arm in operative connection with said counterbalancing means, price indicating means, connections between said arm and price-indicating means for operatively associating the latter with said arm, an element movable on the arm for adjusting the aforesaid connections, and means for positively locking said element against movement on said arm.

12. A scale as described in claim 11, said locking means comprising a pawl supported on the arm and a rack cooperating with the pawl and associated with said element.

13. A computing scale as described in claim 11, adjusting means for moving said element on said arm comprising an endless band, and a pair of pulleys supporting said band, one of said pulleys having a manually manipulable member rigid therewith.

14. A computing scale comprising a pivoted load counterbalancing means, weight indicating means operatively connected therewith, an arm in operative connection with said counterbalancing means, price indicating means operated by said arm, an element movable on said arm for adjusting the price and weight indicating means relatively, and an adjusting means for said element comprising an endless band and a pulley for actuating said band, said pulley having rigid therewith a price-per-unit dial for indicating the proper position of said element for any predetermined price-per-unit.

15. A scale as described in claim 14, a pivot for pivotally supporting said arm, said pulley being rotatable on an axis coaxial with said pivot, and a device on said pulley which may be manually grasped to rotate the pulley.

16. A scale as described in claim 14, and means for positively locking said pulley in adjusted position.

17. A computing scale comprising a load counterbalancing means, weight indicating means operated thereby, price indicating means, a pivoted arm operated by said counterbalancing means for actuating said price indicating means, an element on said arm for adjusting the price and weight indicating means relatively, means for moving said element, and means for holding said arm from movement while said element is being adjusted.

18. A scale as described in claim 17, said element moving means including therein means for operating said arm holding means.

19. A scale as described in claim 17, means for locking said element in position after or prior to adjustment thereof.

20. A scale as described in claim 17, means for locking said element in position after or prior to adjustment thereof, and a common control for said arm locking means and said element locking means.

21. A scale as described in claim 17, means for locking said element in position after or prior to adjustment thereof, and an element common to said arm locking and element locking means operative in one position to effect locking of said arm only and in another position to effect locking of said element only.

22. In a computing scale, the combination with a load counterbalancing means of a weight indicating means operated thereby, a pivoted arm operated by said counterbalancing means, an element movable on said arm, a price indicating dial, operating connections between said dial and said element, an endless band carried by said arm for moving said element, and means for adjusting the tension of said band.

23. A scale as described in claim 22, a pair of pulleys for supporting said band, said band tension adjusting means being operative to adjust the distance between the pulleys for maintaining the proper band tension.

24. A computing scale comprising a load counterbalancing means, a weight indicating means operated thereby, a price indicating means, a pivoted arm operated by said counterbalancing means, operating connections between said arm and said price indicating means including an element for adjusting the price and weight indicating means relatively, and means comprising an anti-friction device flexibly supported by said element for slidably mounting said element on said arm.

25. A computing scale comprising a load support, a pivoted counterbalancing device operatively connected thereto, a member operatively connected to said device, an element adjustable along said member, and an indicating device operated by said element in accordance with the movement of the counterbalancing device and also in accordance with the adjustment of the element on said member.

26. The scale such as defined in claim 25, and said member being rigidly connected to the pivoted counterbalancing device.

In testimony whereof, I have signed my name to this specification.

WILFRED J. ROULEAU.